Sept. 23, 1969  M. SCHUTZ  3,468,128

ROCKET COMBUSTION CHAMBER CONSTRUCTION

Filed Nov. 3, 1967

INVENTOR
Manfred Schutz

By

ATTORNEYS

United States Patent Office 3,468,128
Patented Sept. 23, 1969

3,468,128
ROCKET COMBUSTION CHAMBER
CONSTRUCTION
Manfred Schutz, Ottobrunn, Germany, assignor to Bolkow Gesellschaft mit beschrankter Haftung, Munich, Germany
Filed Nov. 3, 1967, Ser. No. 680,414
Claims priority, application Germany, Nov. 11, 1966,
B 89,775
Int. Cl. F02k 9/02, 5/00
U.S. Cl. 60—261
14 Claims

ABSTRACT OF THE DISCLOSURE

A liquid fuel rocket engine combustion chamber includes a turbine rotatable at the inner normally closed end of the chamber in a position to receive propulsion gases which are generated by combustion in a pre-combustion chamber. The turbine is arranged to rotate a shaft for driving various auxiliary units such as fuel pumps. A feature of the construction is that the end of the turbine inside the blades is protected by a curved heat shield which projects into the combustion chamber. The heat shield includes a curved wall spaced from the outer wall of the combustion chamber through which a fuel component is directed in a direction substantially obliquely outwardly toward the combustion chamber wall and toward the nozzle discharge at the opposite end of the combustion chamber. An additional or second fuel component is introduced into the combustion chamber through nozzles or orifices in an annular member formed into the wall of the combustion chamber adjacent the heat shield at which the first fuel component nozzles are located. This fuel component is directed in a direction obliquely toward the heat shield and toward the nozzle discharge end of the combustion chamber. The gases which are utilized to drive the turbine and which have been generated in the pre-combustion chamber are directed around each end of the heat shield so that they move through a path between the two annular sets of fuel discharge nozzles.

Summary of the invention

This invention relates in general to the construction of liquid fueled rocket engines and in particular to a new and useful rocket engine having a turbine rotatably mounted adjacent the closed end and which receives driving gases from a pre-combustion chamber which are passed between the outer walls and a substantially conically-shaped heat shield extending around the central portion of the turbine and into the combustion chamber, and wherein two separate fuel components are discharged into the space between the heat shield and the wall of the combustion chamber in the path of flow of the gases from the turbine.

The present invention is particularly directed to a liquid fuel rocket engine in which a turbine is mounted for rotation about an axis concentric to the axis of the combustion chamber and it serves as a drive for auxiliary units which are arranged before the main combustion chamber. With rocket engines which operate to the main stream principle, only a part of the total fuel is burned in the pre-chamber or ante-chamber so that the gases generated in such chamber will be at a satisfactory temperature level for driving the turbine. The introduction of additional liquid fuel or propellant into the main combustion chamber is at a location downstream from the discharge of the turbine and is through propellant injection nozzles distributed over the circumference of the combustion chamber wall which are arranged to discharge the propellant radially and obliquely inwardly toward the nozzle discharge end of the combustion chamber, in a manner such that the propellant is distributed over the entire wall of the combustion chamber and insures that the combustion chamber wall is kept relatively cool due to the heat of evaporation of the propellant. In addition, the ring-shaped swirling flow of the propellant produces in the center of the combustion chamber a negative pressure in which a return flow takes place which approaches the turbine rotor and often heats it beyond the limit of thermostability. In order to protect the turbine rotor from heat damage, it is known to provide a heat shield adjacent the turbine which intercepts the hot return flow and since it is a stationary part, it is better able to withstand the high temperatures than the turbine rotor which is also stressed by great centrifugal forces. However, even though such heat shields are made of highly refractory alloys and even of ceramics and sintered materials, they will not stand up under the sustained massive and concentrated oncoming flow of the combustion in the main combustion chamber because of the exceedingly high temperatures. For this reason, liquid-cooled heat shields have been suggested, although the known shields require great expenditure for the construction and installation and they are trouble prone and are still subject to destruction when there is a malfunction.

In accordance with the present invention there is provided a satisfactory cooling of the zone adjacent the end of the turbine and also an arrangement for introducing the fuel or propellant into the main combustion chamber in a manner such that intensive mixing of the propellant with the exhaust gases of the turbine which flow into the combustion chamber is achieved so that there is a better combustion chamber efficiency.

In accordance with the method of the invention, the total quantity of propellant which is introduced into the combustion chamber is divided into partial quantities and one partial quantity is led into the combustion chamber to a location behind the heat shield and is injected outwardly through the heat shield obliquely toward the outer walls of the combustion chamber. The other partial quantity is directed such as by spraying it through nozzles inwardly and obliquely toward the nozzle end of the combustion chamber at a location in alignment with the first fuel component injector nozzles and at a location at which both injected fuel streams will be in the path of flow of the gases from the turbine.

The inventive construction includes a heat shield formed as a hub which is curved from the periphery of the rotor immediately on the interior of the discharge of the blades thereof and inwardly toward the opposite nozzle end of the combustion chamber. The heat shield is supported on spokes or support elements formed by conduits for the fuel component which are lead radially inwardly to the heat shield into a central fuel chamber defined between the heat shield and a fuel chamber wall member. The fuel is conducted from a central location of the fuel chamber radially outwardly to nozzles which are defined in an area of the heat shield which is located radially inwardly from an annular member having nozzles defining a discharge for the other fuel component. Thus, the conduits for the fuel component provide supporting spokes for the heat shield which may be positioned at a location such that the discharge from the gas turbine will flow smoothly around the curved heat shield and expand outwardly into the combustion chamber. By distributing the fuel component in a chamber defined on the interior of the heat shield, the heat shield is adequately cooled so that these structural parts remain free from harmful stresses. The heat shield and the cover on the interior thereof are advantageously made of a curved shape, such as parabolic shape.

Accordingly it is an object of the invention to provide a method of directing fuel into a combustion chamber which includes a turbine rotor at its inner end which discharges its driving gases into this end, and including a heat shield for the turbine formed as a hub extending inwardly into the combustion chamber, comprising directing one fuel component obliquely and radially into the combustion chamber from the walls thereof and directing another portion of the fuel component obliquely and radially against the first component in a manner such that both fuel portions are directed into the flow of the driving gases from the turbine.

A further object of the invention is to provide a means for introducing fuel components into a combustion chamber having a rotatable turbine which is driven from gases generated in a pre-combustion chamber and directed from the turbine into the main combustion chamber, which includes a heat shield formed as a curved member extending around the central portion of the turbine rotor and projecting into the combustion chamber, and means for introducing a first portion of the liquid fuel into the combustion chamber outwardly from the heat shield and a second portion of the fuel radially inwardly from the combustion chamber walls at a location to intersect the inflowing stream of the discharging gases from the turbine, and wherein the fuel component introduced at the heat shield provides a cooling means for the heat shield.

A further object of the invention is to provide a liquid fuel rocket engine combustion chamber construction which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 1:
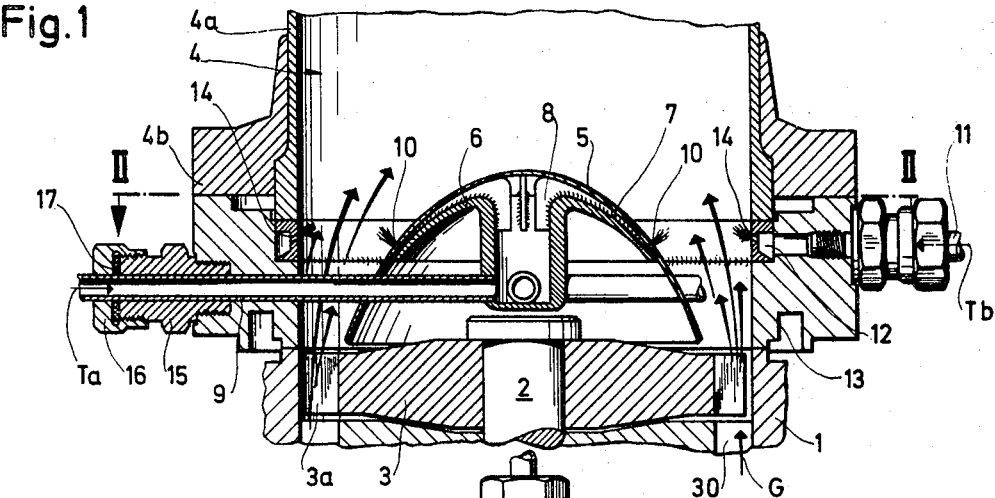
FIG. 1 is a partial longitudinal section of a liquid fuel rocket engine combustion chamber constructed in accordance with the invention.
Figure 2:
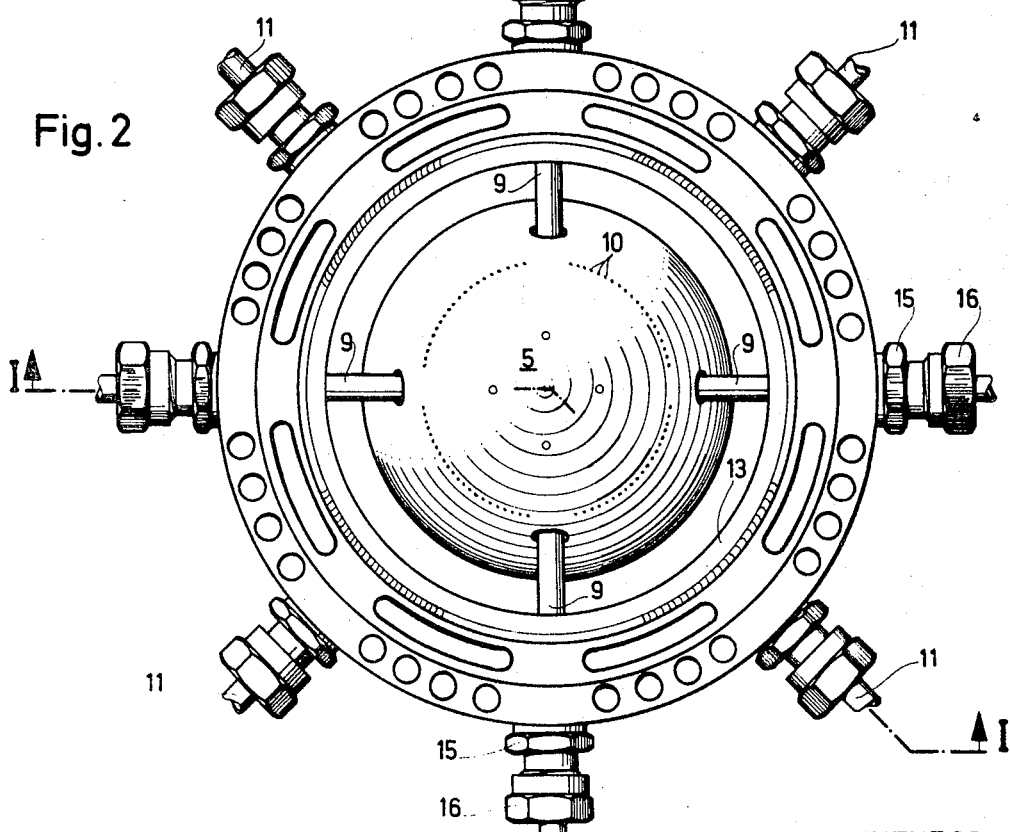
FIG. 2 is a section taken along the line 2—2 of FIG. 1.

General description of the embodiment of the invention

Referring to the drawing in particular, the invention embodied therein comprises a liquid fuel rocket engine including a housing generally designated 1 having a pre-combustion chamber or ante-chamber 30 defined therein in which a portion of the fuel or a single fuel component is burned, for example partially, to form propellent gases or turbine driving gases G which are directed as indicated by the arrow through blades 3a of a turbine rotor 3 which is affixed to a shaft 2 for rotation therewith. The turbine 3 is provided for rotating the shaft 2 to drive auxiliary units (not shown) such as propellent pumps regulators, electric generators and pressure medium producers.

A main combustion chamber housing generally designated 4 is connected to the housing 1 and it includes an interior main combustion chamber tubular member 4a and a combustion chamber head portion 4b. In accordance with a feature of the invention, the turbine 3 is shielded on the interior of the combustion chamber by a parabolically-shaped heat shield or hub-like shield member 5 which curves inwardly from the location of the discharge end of the blades 3a to the center of the combustion chamber and extends in the direction of the nozzle discharge end of the combustion chamber which is not shown. A cover member or fuel chamber forming member 6 is sealed to the interior of the heat shield 5 and encloses a fuel chamber 7. The chamber 7 is divided into a central portion and radially extending portions by a substantially star-shaped guide sheet 8 disposed between the cover member 6 and the heat shield 5. The cover member includes a central cylindrical portion 6a which supports the whole structure and which in turn is supported by a plurality of radially extending conduits or spoke-like duct members 9. The conduits 9 extend outwardly from the heat shield 5 through a portion of the combustion chamber and into the head portion 4b and threaded sleeves 15 and cap nuts 16 which are applied. The fuel ducts 9 are advantageously welded at their inner ends to the cylindrical portion 6a and they pass with a clearance through the heat shield 5.

In accordance with a feature of the invention, only a partial quantity $T_a$ of the total quantity of propellant to be supplied to the main combustion chamber is supplied through the ducts 9 into the cylinder 6a and through the inflow passages 8 and through injection bores or nozzles 10 located at the radially outer end of the passages 8. The fuel component is directed obliquely into the turbine exhaust gas flow $G_a$ in a direction toward the outer wall and toward the nozzle end of the combustion chamber.

Another partial quantity $T_b$ of the propellant which is supplied to the combustion chamber is directed through infeed lines or conduits 11 which communicate with an annular chamber 12 defined by a ring or fuel ring member 13 of substantially U-shaped cross section which is inserted into a recess defined in the head portion 4b. The opened end of the U-shaped cross section connects to the conduits 11 and it is closed peripherally by the portions of the head 4b. The ring member carries a plurality of injection bores or nozzles 14 for spraying the fuel into the gas stream $G_a$ at a radially inwardly and oblique direction toward the discharge end of the combustion chamber. The nozzles 10 and 14 are in substantial radial alignment and they are arranged to direct the fuel portions so that the sprays intersect in the discharge gas stream from the turbine 3.

Because the ducts 9 have a clearance at their passage through the heat shield 5 and they are secured to the combustion chamber head 4b by the use of threaded sleeves 15 and cap nuts 16 with the interposition of a packing ring 17 therebetween, they can freely expand radially under the action of heat.

While a specific embodiment of the invention has been shown and described in detail to illustrate the application of the inventive principles, it will be understood that the invention may be embodied otherwise without departing from such principles.

What is claimed is:

1. A thrust engine combustion chamber construction comprising wall means defining a combustion chamber having a normally closed end and an opposite end through which thrust gases are directed, a turbine rotatably mounted within said combustion chamber adjacent the normally closed end and having turbine blades adjacent the periphery thereof through which driving gases are directed, means for directing driving gases through the turbine blades and into the combustion chamber, a heat shield covering the central portion of said turbine rotor on the combustion chamber side thereof, means for directing a first partial flow of fuel to said heat shield and for discharging the fuel in a direction toward the exterior walls of the heat shield at a location to intersect the flow of driving gases exiting from the turbine blades, and means for directing a second partial flow of fuel inwardly from the walls of the combustion chamber into the flow of driving gases exiting from the blades of the turbine.

2. A thrust engine combustion chamber construction according to claim 1, including means within said heat shield defining a fuel chamber adjacent the walls of said heat shield for cooling the heat shield, the fuel components being directed along the fuel passage before discharge into the combustion chamber.

3. A thrust engine combustion chamber construction according to claim 1, wherein said heat shield is of substantially parabolic configuration and including means defining a central fuel passage and a plurality of radially extending fuel passages adjacent the interior wall of said heat shield, said means for discharging a first partial flow of fuel from said heat shield into said combustion chamber including means for delivering fuel to said central passage and for directing the fuel radially outwardly in contact with the walls of said heat shield and then discharging the fuel into the combustion chamber.

4. A thrust engine combustion chamber construction according to claim 1, wherein said means for delivering a first partial flow of fuel to said heat shield and discharging it outwardly from said heat shield includes means supporting said heat shield within said combustion chamber.

5. A thrust engine combustion chamber construction according to claim 1, including means defining a liquid chamber within the interior of said heat shield, a plurality of spoke-like conduits connected radially into said liquid fuel chamber and supporting said chamber with said heat shield within said combustion chamber.

6. A thrust engine combustion chamber construction according to claim 5, wherein said conduits extend through the heat shield with clearance and are secured at their inner ends to said means defining a liquid chamber.

7. A thrust engine combustion chamber construction according to claim 6, including a guide defined in the interior of said means defining a liquid chamber and defining radially extending passages for the flow of fuel against the wall of said heat shield and to the discharge into the combustion chamber.

8. A thrust engine combustion chamber construction according to claim 1, including means defining a liquid chamber within the interior of said heat shield, said heat shield having a plurality of circumferentially spaced radially directed discharges for directing fuel from said liquid chamber outwardly into said combustion chamber.

9. A thrust engine combustion chamber construction according to claim 1, wherein the walls of said combustion chamber include an annular member having a plurality of discharge openings therein at circumferentially spaced locations and constituting said means for directing a second partial flow of fuel into said combustion chamber.

10. A thrust engine combustion chamber construction according to claim 9, wherein said openings are oriented for discharging fuel obliquely inwardly and toward the discharge end of said combustion chamber.

11. A thrust engine combustion chamber construction according to claim 1, wherein said means for discharging a second partial quantity of fuel radially inwardly into said combustion chamber includes an annular member disposed in a recess of said combustion chamber walls and being of substantially U-shaped configuration and having an open end communicating outwardly with at least one conduit for the fuel, the inner portion of said substantially U-shaped annular member having a plurality of circumferentially spaced openings for the discharge of fuel into the combustion chamber.

12. A liquid fuel rocket engine combustion chamber comprising a tubular member defining a combustion chamber wall, a housing defining a pre-combustion chamber closing one end of said combustion chamber and providing a flow passage for the discharge of pre-combustion turbine driving gases into said combustion chamber, a turbine rotor rotatably mounted in said housing and having blades adjacent the periphery thereof which are arranged to receive the flow of pre-combustion gases which pass therethrough into said combustion chamber, a substantially parabolic-shaped heat shield projecting into the combustion chamber from one side of said turbine and providing a shield for said turbine, wall means within said heat shield defining a central fuel chamber and a fuel passage from said central chamber adjacent the walls of said heat shield terminating in discharge openings through said heat shield for discharging fuel into said combustion chamber, and means in the wall of said tubular member for discharging fuel inwardly from said wall in the vicinity of said heat shield.

13. A liquid fuel rocket engine combustion chamber according to claim 12, wherein said means for directing fuel inwardly to said liquid fuel chamber within said heat shield includes a plurality of spoke-like conduits connected radially into said fuel chamber and supporting said fuel chamber and said heat shield within said combustion chamber.

14. A liquid fuel rocket engine combustion chamber according to claim 12, wherein said means in said wall of said tubular member comprises an annular member of substantially U-shaped cross section having an open outwardingly extending portion, a head member closing the open outwardly extending portion of said annular member, and a conduit for fuel connected into said head communicating with said open outwardly extending portion, said annular member having a plurality of circumferentially spaced openings through which the fuel is directed.

References Cited

UNITED STATES PATENTS

| 2,479,776 | 8/1949 | Price | 60—261 |
| 2,979,899 | 4/1961 | Salmon | 60—261 |
| 3,232,048 | 2/1966 | Stockel | 60—261 |
| 3,377,803 | 4/1968 | Prachar | 60—39.74 |

FOREIGN PATENTS

| 793,300 | 4/1958 | Great Britain. |

CARLTON R. CROYLE, Primary Examiner

D. HART, Assistant Examiner

U.S. Cl. X.R.

60—39.72, 39.74